June 27, 1967   H. LLOYD ETAL   3,327,892
CLOSURE MEANS FOR TUBULAR MEMBERS
Filed June 4, 1962
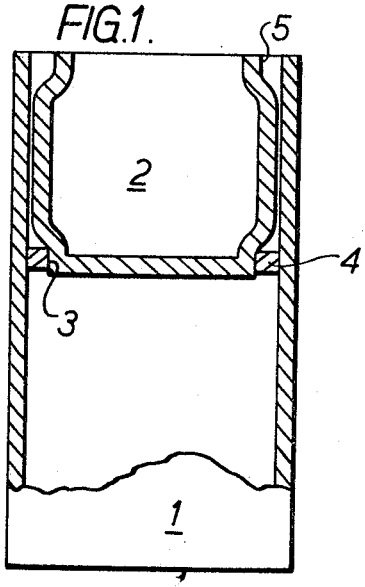
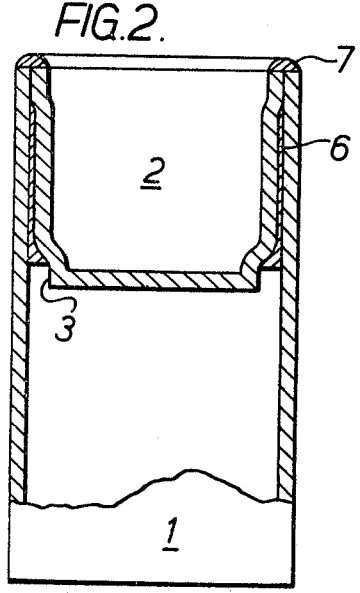
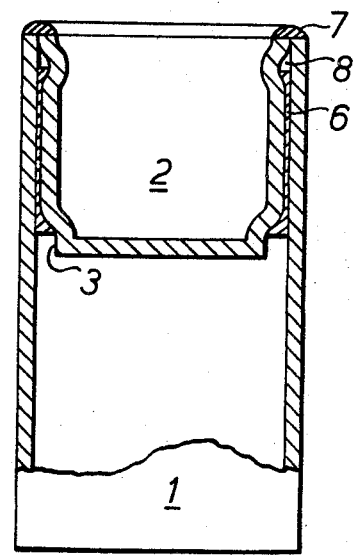

United States Patent Office 3,327,892
Patented June 27, 1967

3,327,892
CLOSURE MEANS FOR TUBULAR MEMBERS
Henry Lloyd, Wantage, and Harold Ralph William Cobb, Didcot, England, assignors to United Kingdom Atomic Energy Authority, London, England
Filed June 4, 1962, Ser. No. 199,731
Claims priority, application Great Britain, June 13, 1961, 21,260/61
4 Claims. (Cl. 220—67)

This invention relates to a method of sealing the end of a tubular member and is particularly concerned with the brazing of an end closure member to a nuclear fuel can.

The end of a tubular fuel can for a nuclear reactor may be closed by the insertion of a cup shaped end closure member but difficulties can arise when it is desired to braze the closure member to the can due to the necessity of using a braze metal compatible with the reactor coolant, or in ensuring that the braze metal does not contact the reactor coolant. Further difficulties can arise if it is considered desirable to seal weld the contiguous edges of the end closure member and the can to provide a double sealing arrangement, since in this instance it is necessary to prevent contamination of the edge weld by the braze metal.

It is an object of the present invention to provide a method of brazing an end closure member to a tubular member wherein the tendency of the braze metal to emerge from the joint surfaces is minimised.

According to the invention a method of brazing an end closure member to a tubular member comprises the steps of producing a capillary film of braze metal between the tubular member and the closure member to form a joint and interrupting said film by spacing the closure member and the tubular member apart at each end of the joining surface a distance insufficiently small to maintain the capillary film.

Also according to the invention a closure means for a tubular member comprises a cup shaped end closure member, a first recess between the closure member and the tubular member, a ring of braze metal in the first recess and a second recess between the closure member and the tubular member intermediate the first recess and the outer edge of the closure member, whereby upon heating to the melting point of the braze metal a capillary film of braze metal will extend between the recesses.

To enable the nature of the invention to be more readily understood an embodiment of the invention will be described, by way of example, with reference to the accompanying drawings. In the drawings:

FIG. 1 is a sectional end elevation of a tubular fuel can with an end closure member in position in preparation for sealing operations.

FIG. 2 is a similar view of the can of FIG. 1 after completion of the sealing operations.

FIG. 3 is a similar view of the can of FIG. 1 after completion of a modified form of closure.

Referring to FIG. 1 the fuel can 1 comprises a stainless steel tube 1.003 in. internal diameter having a wall thickness 0.015 in. The end of the can is closed by a cup shaped closure member 2 inserted into the bore of the can and subsequently brazed and edge welded to the can. The closure member is of similar material and thickness to the can and has an outside diameter 0.0005 in. to 0.0001 in. smaller than the bore of the can. A peripheral recess 3 of 0.040 in. axial length and 0.020 in. in radial depth is formed in the inner edge of the closure member and a ring of copper 4, radial thickness 0.020 inch and depth 0.060 inch is located in this recess between the closure member and the can. The ring is forced onto the locating recess before the closure member is pushed into the tube and it is important that the copper ring 4 makes contact between the can and the closure member as the ring acts as a heat conduction path during the heating operation.

A second peripheral recess 5 approximately 0.020 in. in radial depth and 0.1 inch wide is also provided at the outer edge of the closure member.

In preparation for the end sealing of the can the cup 2 is pushed into the end of the can which may be bell-mouthed slightly to provide additional width in the annular gap between the closure member recess 5 and the inner surface of the can.

During the brazing operation the can is placed in a vacuum chamber and heated to 1080° C–1100° C. Upon reaching melting point the copper flows by capillary action from recess 3, forming a capillary film between the closure member and the can. The film is interrupted on reaching the second recess 5 since the annular distance between the can and the closure member at this point is insufficiently small to maintain the capillary film. The actual brazing time is approximately 30 seconds and the quantity of copper in the ring is predetermined to just fill the annular clearance space between the closure member and the can with an additional small fillet of copper at each end of the joining surface.

As preparation for the subsequent seal welding of the contiguous edges of the closure member and can the closed can is rolled to close the annular gap and thus provide close contact between the edges of the closure member and can. Some deformation in the end closure member should remain to accommodate excess braze metal as a fillet at the outer end of the brazed surface. The contiguous edges 7 may then be sealed by a standard argon arc welding process resulting in a closed can as shown in FIG. 2.

A modified form of closure is shown in FIG. 3 in which an annular reservoir or channel 8 is provided during the closing of the annular gap between the closure member recess 5 and the inner surface of the can. Such a reservoir may be filled with a tracer gas, such as helium, to facilitate leak testing of the welded seal. One method of filling the reservoir with gas is to incorporate the suitable gas in the argon stream during the seal welding operation.

We claim:
1. An end sealing joint for a tubular member comprising in combination a tubular member, a cup shaped closure member having a bottom portion and a tubular side wall disposed within said tubular member, said cup shaped closure member having its open end substantially coplanar with an end of the tubular member, and the peripheral area of the closure member side wall adjacent its open end in contact with said tubular member, said coplanar ends being seam welded together, the tubular side wall of said cup shaped closure member having an annular recess at the end adjacent said bottom portion, a tubular capillary film of braze metal positioned within an annular space between said tubular member and the side wall of said cup shaped closure member, said film extending from within said annular recess to a point adjacent to but not touching the welded portion of said end sealing joint, and said tubular film extending about the periphery of said cup shaped closure member and filling the space between the cup shaped closure member and the tubular member.

2. An end sealing joint according to claim 1 wherein a closed annular reservoir is formed between the welded portion of said end sealing joint and said tubular capillary film of braze metal, said reservoir containing a tracer gas therein.

3. A method of sealing a tubular member comprising the steps of providing a tubular member concentric with a cup shaped closure member such that the inside of said tubular member is in close adjacency with the inside of said cup shaped closure member said cup shaped closure member having a first annular recess at one end adjacent said bottom portion and having a ring of braze metal positioned therein and having a second annular recess at the edge adjacent the open end of said cup shaped closure member, producing a capillary film of braze metal in an annular space between said tubular member and said cup shaped closure member by heating the braze metal to the melting point such that it flows from said first annular recess to said second annular recess, said second annular recess being sufficiently large to prevent exudation of the braze metal through the second annular recess, deforming the edge adjacent the open end of said cup shaped closure member to bring the edge in contact with the inside of said tubular member, and welding said edge to said inside of said tubular member.

4. A method of sealing a tubular member according to claim 3 wherein said cup shaped closure member is placed inside an end of said tubular member with its open end corresponding to that of the tubular member.

References Cited

UNITED STATES PATENTS

| 1,105,143 | 7/1914 | Johnson | 220—81 |
| 1,248,945 | 12/1917 | Stoner | 220—67 |
| 2,039,255 | 4/1936 | Marland | 220—67 |
| 2,440,298 | 4/1948 | Ronay et al. | 29—501 X |
| 2,674,105 | 4/1954 | Prosek | 29—489 X |
| 2,748,464 | 6/1956 | Kaul. | |
| 3,053,969 | 9/1962 | Kerr et al. | 219—117 |

FOREIGN PATENTS

| 1,009,895 | 6/1957 | Germany. |

THERON E. CONDON, *Primary Examiner.*

J. R. GARRETT, *Assistant Examiner.*